United States Patent
McCaffrey et al.

(10) Patent No.: US 10,161,258 B2
(45) Date of Patent: Dec. 25, 2018

(54) BOAS RAIL SHIELD

(71) Applicant: UNITED TECHNOLOGIES CORPORATION, Farmington, CT (US)

(72) Inventors: Michael G. McCaffrey, Windsor, CT (US); Benjamin F. Hagan, Winston-Salem, NC (US); David Richard Griffin, Tolland, CT (US); Peter Balawajder, West Hartford, CT (US); Christopher Corcoran, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 267 days.

(21) Appl. No.: 15/071,485

(22) Filed: Mar. 16, 2016

(65) Prior Publication Data

US 2017/0268369 A1  Sep. 21, 2017

(51) Int. Cl.
*F01D 11/08* (2006.01)
*F01D 5/02* (2006.01)
(Continued)

(52) U.S. Cl.
CPC ................ *F01D 11/08* (2013.01); *F01D 5/02* (2013.01); *F01D 9/04* (2013.01); *F01D 25/24* (2013.01);
(Continued)

(58) Field of Classification Search
CPC . F01D 11/08; F01D 9/04; F01D 25/24; F01D 25/246; F01D 25/12; F01D 25/26; F01D 25/14; F01D 25/145; F01D 11/14; F01D 11/16; F01D 11/18; F01D 11/24; F01D 11/12; F01D 11/005; F01D 11/20; F05D 2260/30; F05D 2240/11; F05D 2300/6033; F05D 2240/55; F05D 2260/231; F05D 2220/32
See application file for complete search history.

(56) References Cited

U.S. PATENT DOCUMENTS 3,966,356 A * 6/1976 Irwin ..................... F01D 11/08
                                                    277/545
4,087,199 A   5/1978 Hemsworth et al.
(Continued)

FOREIGN PATENT DOCUMENTS

EP   1918526   5/2008
EP   2473713   7/2012
(Continued)

OTHER PUBLICATIONS

European Search Report for EP Application No. 17161109.8 dated Aug. 21, 2017.

*Primary Examiner* — Eldon Brockman
(74) *Attorney, Agent, or Firm* — Carlson, Gaskey & Olds, P.C.

(57) ABSTRACT

A seal assembly includes a seal arc segment that defines radially inner and outer sides with the radially outer side including radially-extending sidewalls. A radially inner surface joins the radially-extending sidewalls. The radially-extending sidewalls and the radially inner surface define a pocket. A rail shield has radially-extending walls lines the radially-extending sidewalls.

21 Claims, 5 Drawing Sheets

(51) Int. Cl.
  *F01D 25/24* (2006.01)
  *F01D 9/04* (2006.01)
(52) U.S. Cl.
  CPC ........ *F01D 25/246* (2013.01); *F05D 2220/32* (2013.01); *F05D 2230/60* (2013.01); *F05D 2240/11* (2013.01); *F05D 2240/55* (2013.01); *F05D 2260/231* (2013.01); *F05D 2300/10* (2013.01)

(56) References Cited

U.S. PATENT DOCUMENTS

| | | | |
|---|---|---|---|
| 4,527,385 A | 7/1985 | Jumelle et al. | |
| 4,650,395 A * | 3/1987 | Weidner | F01D 11/08 415/115 |
| 4,728,257 A | 3/1988 | Handschuh | |
| 5,127,793 A * | 7/1992 | Walker | F01D 11/08 415/115 |
| 5,195,868 A * | 3/1993 | Plemmons | F01D 25/145 29/525.02 |
| 5,609,469 A | 3/1997 | Worley et al. | |
| 5,630,700 A * | 5/1997 | Olsen | F01D 5/189 415/134 |
| 5,639,210 A | 6/1997 | Carpenter et al. | |
| 6,142,731 A | 11/2000 | Dewis et al. | |
| 6,431,825 B1 | 8/2002 | McLean | |
| 6,464,456 B2 * | 10/2002 | Darolia | F01D 5/3084 415/134 |
| 6,547,522 B2 * | 4/2003 | Turnquist | F01D 11/122 415/173.3 |
| 6,726,448 B2 | 4/2004 | McGrath et al. | |
| 6,733,235 B2 | 5/2004 | Alford et al. | |
| 7,052,235 B2 | 5/2006 | Alford et al. | |
| 7,163,206 B2 | 1/2007 | Cross et al. | |
| 7,435,049 B2 | 10/2008 | Ghasripoor et al. | |
| 7,527,472 B2 | 5/2009 | Allen | |
| 7,909,335 B2 * | 3/2011 | Turnquist | F16J 15/441 277/355 |
| 7,959,407 B2 | 6/2011 | Tholen | |
| 8,123,466 B2 | 2/2012 | Pietraszkiewicz et al. | |
| 8,186,945 B2 | 5/2012 | Bhatnagar et al. | |
| 8,303,247 B2 | 11/2012 | Schlichting et al. | |
| 8,348,602 B2 * | 1/2013 | Botrel | F01D 11/24 415/173.1 |
| 8,439,636 B1 | 5/2013 | Liang | |
| 8,534,995 B2 | 9/2013 | McCaffrey | |
| 8,568,091 B2 | 10/2013 | McCaffrey | |
| 8,585,357 B2 | 11/2013 | DiPaola et al. | |
| 8,596,963 B1 | 12/2013 | Liang | |
| 8,790,067 B2 | 7/2014 | McCaffrey et al. | |
| 8,876,458 B2 | 11/2014 | Thibodeau et al. | |
| 8,920,127 B2 | 12/2014 | McCaffrey | |
| 8,932,009 B2 * | 1/2015 | Moraines | F01D 11/24 415/116 |
| 8,944,756 B2 | 2/2015 | Lagueux | |
| 9,039,358 B2 | 5/2015 | Tholen et al. | |
| 9,115,596 B2 | 8/2015 | Clouse | |
| 9,169,739 B2 | 10/2015 | Mironets et al. | |
| 9,200,530 B2 | 12/2015 | McCaffrey | |
| 9,228,447 B2 | 1/2016 | McCaffrey | |
| 2005/0220610 A1 * | 10/2005 | Ghasripoor | F01D 5/225 415/173.3 |
| 2006/0038358 A1 | 2/2006 | James | |
| 2007/0025837 A1 | 2/2007 | Pezzetti, Jr. et al. | |
| 2008/0101923 A1 * | 5/2008 | Botrel | F01D 11/24 415/173.1 |
| 2008/0211192 A1 | 9/2008 | Pietraszkiewicz et al. | |
| 2009/0096174 A1 | 4/2009 | Spangler et al. | |
| 2009/0169368 A1 | 7/2009 | Schlichting et al. | |
| 2009/0208322 A1 | 8/2009 | McCaffrey | |
| 2009/0285671 A1 * | 11/2009 | Liang | F01D 11/24 415/116 |
| 2010/0226760 A1 | 9/2010 | McCaffrey | |
| 2011/0044803 A1 | 2/2011 | Di Paola et al. | |
| 2011/0044804 A1 | 2/2011 | DiPaola et al. | |
| 2012/0163957 A1 * | 6/2012 | Moraines | F01D 11/24 415/116 |
| 2012/0195743 A1 | 8/2012 | Walunj et al. | |
| 2012/0275898 A1 | 11/2012 | McCaffrey et al. | |
| 2013/0017057 A1 | 1/2013 | Lagueux | |
| 2013/0022469 A1 | 1/2013 | McCaffrey | |
| 2013/0113168 A1 | 5/2013 | Lutjen et al. | |
| 2013/0209240 A1 | 8/2013 | McCaffrey | |
| 2014/0016761 A1 | 1/2014 | Werner | |
| 2014/0017072 A1 | 1/2014 | McCaffrey | |
| 2014/0023480 A1 | 1/2014 | McCaffrey | |
| 2014/0033149 A1 | 1/2014 | Groves et al. | |
| 2014/0044528 A1 | 2/2014 | Clouse | |
| 2014/0053040 A1 | 2/2014 | Hargan | |
| 2014/0127006 A1 | 5/2014 | Romanov et al. | |
| 2014/0133955 A1 | 5/2014 | McCaffrey et al. | |
| 2014/0186152 A1 | 7/2014 | McCaffrey et al. | |
| 2015/0016954 A1 | 1/2015 | Thibodeau et al. | |
| 2015/0031764 A1 | 1/2015 | Kraus et al. | |
| 2015/0226132 A1 | 8/2015 | Roy Thill et al. | |
| 2015/0337672 A1 | 11/2015 | McCaffrey et al. | |
| 2015/0369076 A1 | 12/2015 | McCaffrey et al. | |
| 2016/0003078 A1 | 1/2016 | Stevens et al. | |
| 2016/0003080 A1 | 1/2016 | Mcgarrah | |
| 2017/0268369 A1 * | 9/2017 | McCaffrey | F01D 5/02 |

FOREIGN PATENT DOCUMENTS

| | | |
|---|---|---|
| WO | 2015038906 | 3/2015 |
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |

* cited by examiner

BOAS RAIL SHIELD

BACKGROUND OF THE INVENTION

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY OF THE INVENTION

A seal assembly according to an example of the present disclosure includes a seal arc segment that defines radially inner and outer sides with the radially outer side including radially-extending sidewalls. A radially inner surface joins the radially-extending sidewalls. The radially-extending sidewalls and the radially inner surface define a pocket. A rail shield has radially-extending walls lines the radially-extending sidewalls.

In a further embodiment of any of the foregoing embodiments, the rail shield is an endless structure.

A further embodiment of any of the foregoing embodiments includes a seal between the rail shield and the radially-extending sidewalls.

In a further embodiment of any of the foregoing embodiments, the rail shield has a first radial end and a second radial end, and the first radial end and second radial end are open.

A further embodiment of any of the foregoing embodiments includes a seal between the rail shield and the radially-extending sidewalls, wherein the seal and the rail shield seal the radially-extending sidewalls from fluid entering the first radial end of the rail shield.

In a further embodiment of any of the foregoing embodiments, the rail shield defines a groove adjacent the second radial end, and the seal is disposed in the groove.

In a further embodiment of any of the foregoing embodiments, the seal is a rope seal contiguous with the radially-extending sidewalls.

In a further embodiment of any of the foregoing embodiments, the seal arc segment is a first material, the rail shield is a second material, and the first material is different from the second material.

In a further embodiment of any of the foregoing embodiments, the second material is a metallic alloy.

In a further embodiment of any of the foregoing embodiments, a radially outer surface of the rail shield is radially flush with a radially outer surface of the seal arc segment.

In a further embodiment of any of the foregoing embodiments, the pocket extends circumferentially a majority of the circumferential length of the seal arc segment.

In a further embodiment of any of the foregoing embodiments, the pocket extends axially a majority of the axial length of the seal arc segment.

In a further embodiment of any of the foregoing embodiments, the seal arc segment defines first and second seal supports. The assembly further includes a carriage defining first and second support members. The first support member supports the seal arc segment in a first ramped interface, and the second support member supports the seal arc segment in a second ramped interface.

A gas turbine engine according to an example of the present disclosure includes a rotor section that has a rotor with a plurality of blades and at least one annular seal system circumscribing the rotor. The annular seal system includes a plurality of seal arc segments and a plurality of corresponding rail shields, with each of the seal arc segments defining radially inner and outer sides. The radially outer side includes radially-extending sidewalls and a radially inner surface joining the radially-extending sidewalls. The radially-extending sidewalls and the radially inner surface define a pocket. The corresponding rail shield has radially-extending walls lining the radially-extending sidewalls of the pocket.

In a further embodiment of any of the foregoing embodiments, the corresponding rail shield has a first radial end and a second radial end, and the first radial end and second radial end are open.

In a further embodiment of any of the foregoing embodiments, the annular seal system further includes a plurality of corresponding seals, and the corresponding seal is between the corresponding rail shield and the radially-extending sidewalls.

In a further embodiment of any of the foregoing embodiments, the seal arc segment is a first material, the rail shield is a second material, and the first material is different from the second material.

A method of manufacturing a seal according to an example of the present disclosure includes providing a seal arc segment that defines radially inner and outer sides. The radially outer side includes radially-extending sidewalls, and a radially inner surface joins the radially-extending sidewalls. The radially-extending sidewalls and the radially inner surface define a pocket. The method further includes inserting a rail shield in the pocket. The rail shield has radially extending walls lining the radially-extending sidewalls.

A further embodiment of any of the foregoing embodiments includes inserting a seal in the pocket, wherein the seal is between the rail shield and the radially-extending sidewalls.

In a further embodiment of any of the foregoing embodiments, the seal is disposed in a groove of the rail shield.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
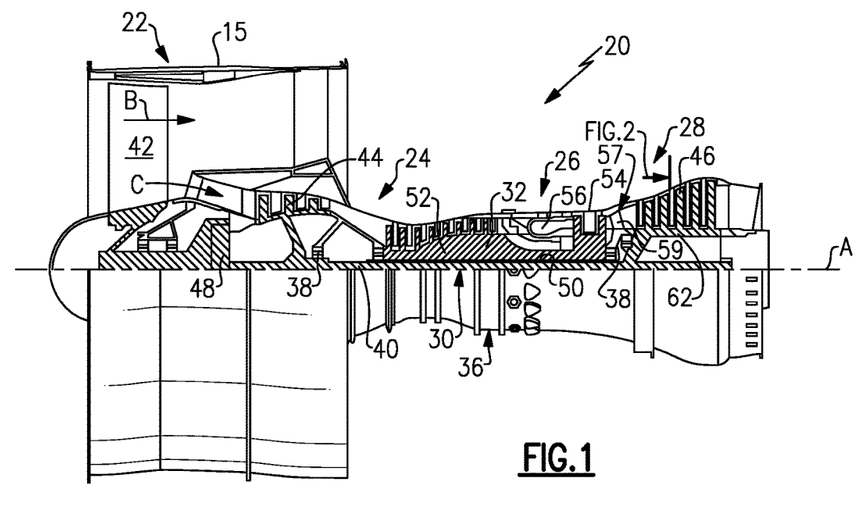
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
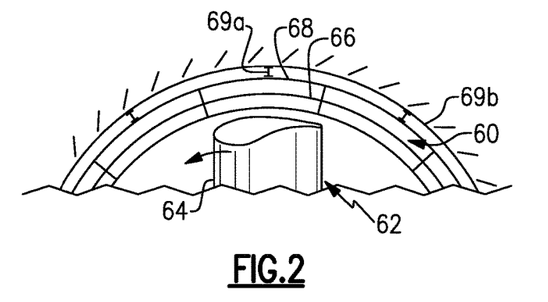
FIG. 2 illustrates an axial view of a seal assembly of a gas turbine engine.

FIG. 2 illustrates a partial axial view through a portion of one of the stages of the turbine section 28. In this example, the turbine section 28 includes an annular blade outer air seal (BOAS) system or assembly 60 (hereafter BOAS 60) that is located radially outwards of a rotor or rotor section 62 that has a row of rotor blades 64. As can be appreciated, the BOAS 60 can alternatively or additionally be adapted for other portions of the engine 20, such as the compressor section 24.

The BOAS 60 includes a plurality of seal arc segments 66 that are circumferentially arranged in an annulus around the central axis A of the engine 20. The seal arc segments 66 are mounted in a carriage 68, which may be continuous or segmented. The carriage 68 is mounted through one or more connections 69a to a case structure 69b. The BOAS 60 is in close radial proximity to the tips of the blades 64, to reduce the amount of gas flow that escapes around the blades 64.

Figure 3:
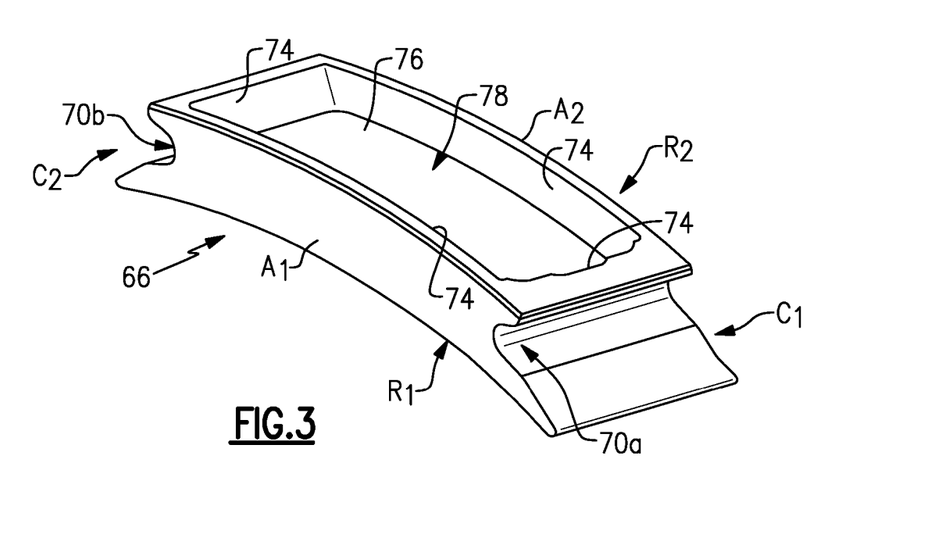
FIG. 3 illustrates an isolated view of a seal arc segment of a seal assembly.
Figure 4:
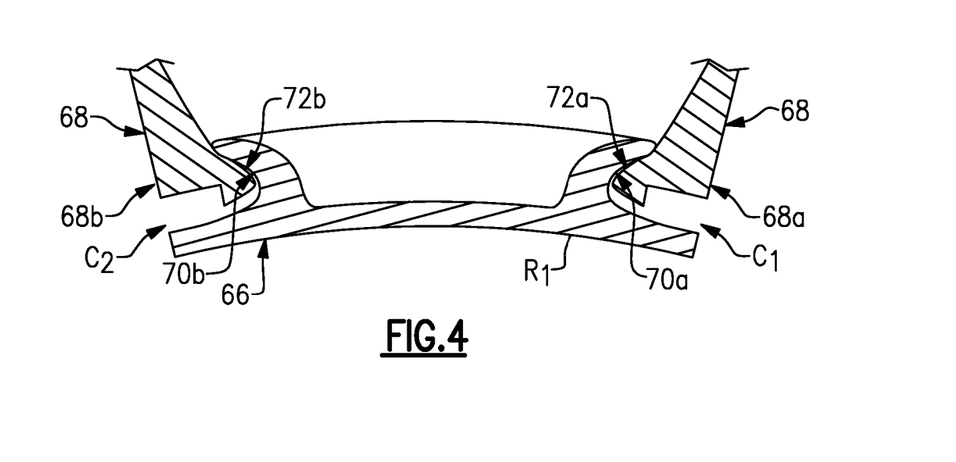
FIG. 4 illustrates a seal arc segment mounted in a carriage.

FIG. 3 illustrates an isolated view of a representative one of the seal arc segments 66, and FIG. 4 illustrates a view of the seal arc segment 66 mounted in a portion of the carriage 68. As will be appreciated, the examples herein may be used to provide compliant, low-stress mounting of the seal arc segment 66 in the carriage 68. In particular such compliant low-stress mounting may be useful for seal arc segments 66 formed of materials that are sensitive to stress concentrations, although this disclosure is not limited and other types of seals and materials will also benefit.

Although not limited, the seal arc segments 66 (i.e., the body thereof) may be monolithic bodies that are formed of a high thermal-resistance, low-toughness material. For example, the seal arc segments 66 may be formed of a high thermal-resistance low-toughness metallic alloy or a ceramic-based material, such as a monolithic ceramic or a ceramic matrix composite. One example of a high thermal-resistance low-toughness metallic alloy is a molybdenum-based alloy. Monolithic ceramics may be, but are not limited to, silicon carbide (SiC) or silicon nitride ($Si_3N_4$). Alternatively, the seal arc segments 66 may be formed of high-toughness material, such as but not limited to metallic alloys.

Each seal arc segment 66 is a body that defines radially inner and outer sides R1/R2, first and second circumferential ends C1/C2, and first and second axial sides A1/A2. The radially inner side R1 faces in a direction toward the engine central axis A. The radially inner side R1 is thus the gas path side of the seal arc segment 66 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In this example, the first and second circumferential ends C1/C2 define, respectively, first and second seal supports 70a/70b by which the carriage 68 radially supports or suspends the seal arc segment 66. The seal arc segment 66 is thus end-mounted. In the example shown, the first and second seal supports 70a/70b have a dovetail geometry.

The carriage 68 includes first and second support members 68a/68b that serve to radially support the seal arc segment 66 via, respectively, the first and second seal supports 70a/70b. In the example shown, the first and second support members 68a/68b are hook supports that interfit with the dovetail geometry of the first and second seal supports 70a/70b.

The first support member 68a supports the seal arc segment 66 in a first ramped interface 72a and the second support member 68b supports the seal arc segment 66 in a second ramped interface 72b. For instance, each of the ramped interfaces 72a/72b includes at least one ramped surface on the seal arc segment, the carriage 68, or both. In the example shown, the surfaces of the first and second seal supports 70a/70b and the surfaces of the first and second support members 68a/68b are ramped. The term "ramped" as used herein refers to a support surface that is sloped with respect to both the radial and circumferential directions.

The ramped interfaces 72a/72b permit the seal arc segment 66 to move circumferentially with respect to the carriage 68 as the seal arc segment 66 slides up and down the ramped interfaces 72a/72b. Friction in the ramped interfaces 72a/72b during sliding movement can potentially provide damping, and the relatively large contact area across the ramped interfaces 72a/72b distributes loads transferred through the ramped interfaces 72a/72b, which also serves to potentially reduce stress concentrations on the seal arc segment 66.

The radially outer side R2 of the seal arc segment 66 includes radially-extending rails or sidewalls 74 (FIG. 3) and a radially inner or innermost surface 76 that joins the sidewalls 74. The sidewalls 74 and the radially inner surface 76 define a pocket 78 on the radially outer side R2 of the seal arc segment 66. In this example, the pocket 78 is open on its radially outer side.

Figure 5:
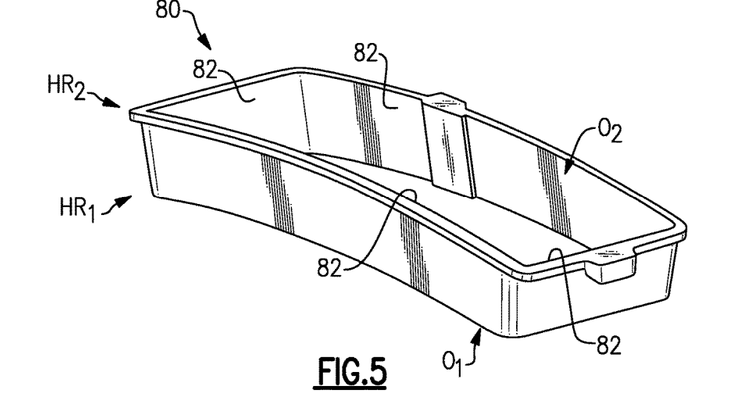
FIG. 5 illustrates a rail shield.
Figure 6:
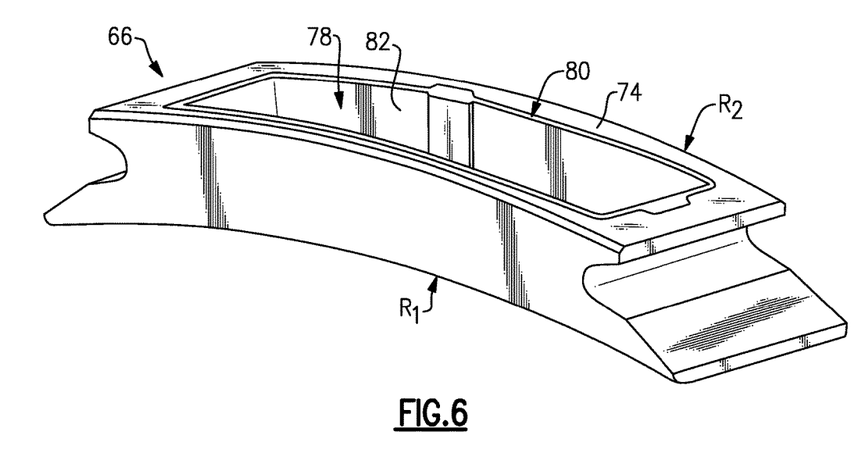
FIG. 6 illustrates a rail shield received in a seal arc segment.

Referring to FIGS. 5 and 6, a rail shield 80 is received in the pocket 78 of the seal arc segment 66. The rail shield 80 includes a number of radially-extending walls 82, forming an opening O1 at the radial end HR1 and an opening O2 at the opposite radial end HR2. The rail shield 80 in this example is thus an endless structure. Alternatively, for example, the rail shield 80 may be a multi-piece structure. The rail shield 80 is received in the pocket 78 such that the walls 82 line the radially extending sidewalls 74 of the pocket 78. Such a lining arrangement may or may not include contact between the walls 82 and the sidewalls 74. With the rail shield 80 received in the pocket 78, the pocket 78 is still substantially open at the radial end R2 of the seal arc segment 66.

In one example, the pocket 78 extends a majority of the circumferential length of the seal arc segment 66. The pocket 78 may also extend a majority of the axial length of the seal arc segment 66. The circumferential length of the opening O1 may substantially equal a majority of the circumferential length of the seal arc segment 66. The axial length of the opening O1 may substantially equal a majority of the axial length of the seal arc segment 66. The circumferential length of the opening O2 may substantially equal a majority of the circumferential length of the seal arc segment 66. The axial length of the opening O2 may substantially equal a majority of the axial length of the seal arc segment 66.

Figure 7:
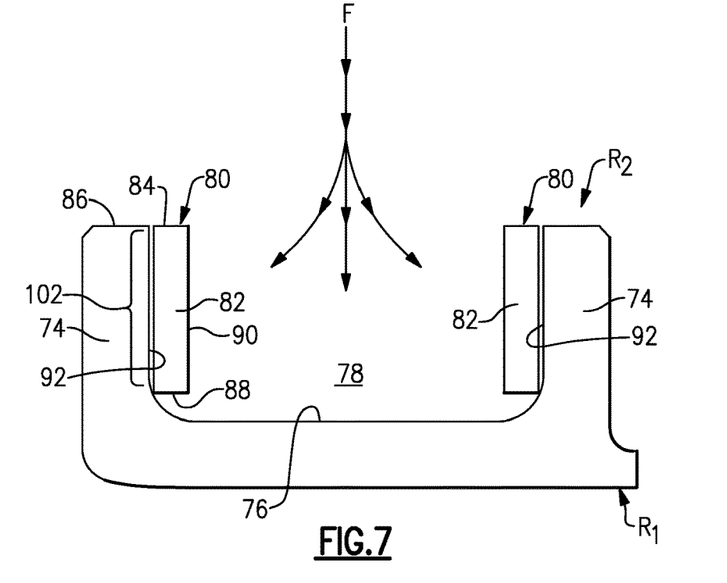
FIG. 7 illustrates an axial cross sectional view of a rail shield received in a seal arc segment.

As shown in FIG. 7, the open rail shield 80 allows a fluid flow F to flow into the pocket 78. This fluid F may be cooling air used to cool the radially inner surface 76 of the pocket 78. As one example, this air is from the compressor section 24. The walls 82 of the rail shield 80 serve as a protective barrier against direct exposure of the radially extending sidewalls 74 of the seal arc segment 66 to the fluid F. In this example, the section 102 extends radially from the first radial end HR1 of the rail shield 80 to the second radial end HR2 of the rail shield 80. The radially outer surface 84 of the rail shield 80 at the end HR2 may be approximately radially flush with the radially outer surface 86 of the seal arc segment 66 to shield the radially outer end R2 of the sidewall 74. The radial face surface 90 of the rail shield 80, the radially inner surface 76 of the pocket 78, and the radially inner surface 88 of the rail shield 80 are exposed to the fluid flow F. The inner surface 92 of the sidewalls 74, extending radially along the section 102, are not directly exposed to the fluid F.

Figure 8:
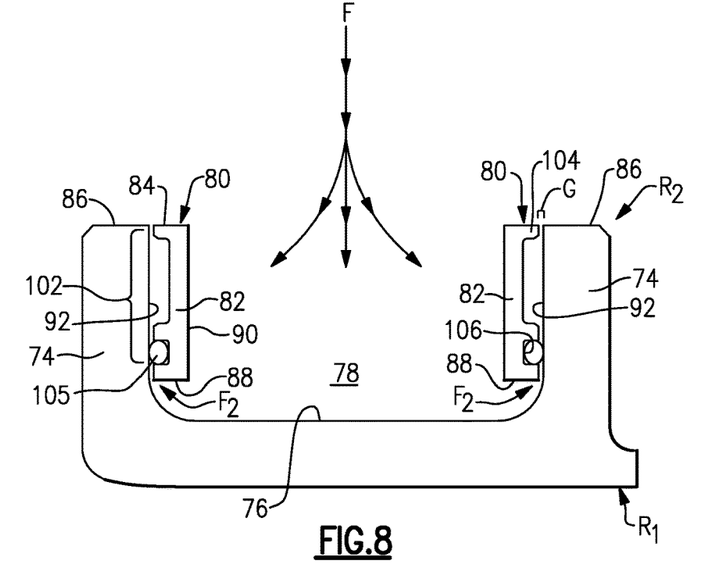
FIG. 8 illustrates an axial cross sectional view of a rail shield and a seal received in a seal arc segment.
Figure 9:
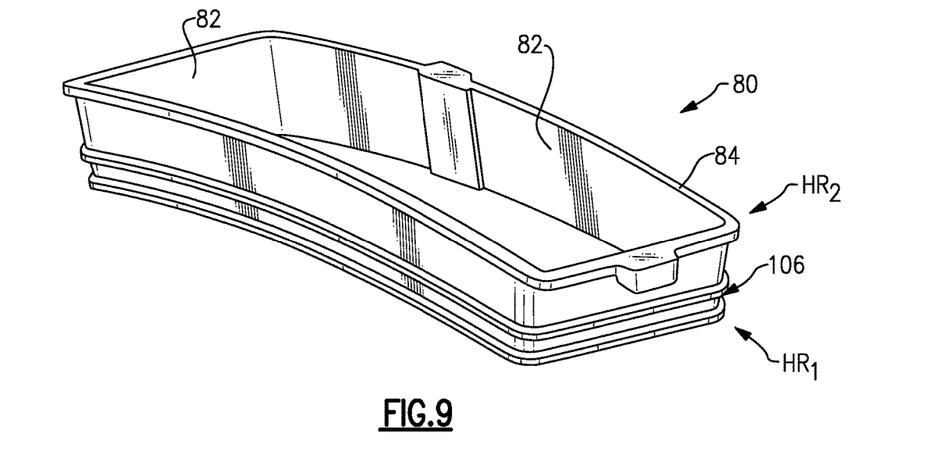
FIG. 9 illustrates a second example rail shield.

As illustrated in FIG. 8, in another embodiment, a seal 105 is contiguous with the inner surface 92 of the sidewalls 74. The seal 105 is arranged between the sidewalls 74 and the rail shield 80. The seal may be adjacent the radial end HR1 of the rail shield 80. In this example, the seal 105 is received in a groove 106 (FIG. 9) of the rail shield 80, such that the seal 105 is axially between the rail shield 80 and the sidewalls 74. In this example, the section 102 extends radially from the seal 105 to radially the radial end HR2 of the rail shield 80. The seal 105 effectively seals the section 102 of the inner surface 92 of the sidewalls 74 from the component F2 of the fluid flow F.

The fluid flow F thus flows across the radial face surface 90 of the rail shield 80 to the inner surface 76 of the pocket 78 but cannot flow upward toward the section 102 of the inner surface 92 of the sidewalls 74 because of the seal 105 and the rail shield 80. The radial face surface 90 of the rail shield 80, the radially inner surface 76 of the pocket 78, the radially inner surface 88 of the rail shield 80, and a surface of the seal 105 are exposed to the fluid flow F. The inner surface 92 of the sidewalls 74, extending radially along the section 102, are not directly exposed to the fluid. The radial position of the seal 105 may be varied to vary the radial length and position of the section 102.

In one example, the seal 105 is a ceramic rope seal having a braided metallic sheath around a ceramic core. The metallic sheath may be a nickel or cobalt alloy, for example. As another example, the sheath is made from Haynes 188 alloy. The ceramic may be an aluminum oxide ceramic fiber.

Although not limited, another example seal 105 type is a finger seal—a thin flexible piece of sheet metal contiguous with the radially-extending sidewalls 74.

The rail shield 80 may be a metallic alloy, such as a nickel alloy or a cobalt alloy, for example. The rail shield 80 may thus grow thermally at a faster rate than the high thermal resistance material seal arc segment 66. In this case, a gap G is provided between the lip 104 at the radially outer end of the rail shield 80 and the sidewalls 74. The seal 105 and the gap G allow the rail shield 80 to be spaced from the sidewalls 74 such that the thermal expansion of the rail shield 80 will not place stresses on the ceramic seal arc segment 66.

Due to its proximity to the gas path surface at the end R1 of the seal arc segment 66, the inner surface 76 of the pocket 78 experiences hotter temperatures than the sidewalls 74. Thus, to reduce the thermal gradient of the seal arc segment 66, the surface 76 may be cooled without cooling the sidewalls 74. The rail shield 80 and seal 105 (when applicable) allow the inner surface 76 to be cooled by the fluid flow F without exposing the sidewalls to the fluid flow F. This flow path keeps the temperature at the sidewalls 74 closer to the temperature of the rest of the seal arc segment 66, thereby reducing the thermal stresses in the seal arc segment 66 by reducing thermal gradient.

Figure 10:
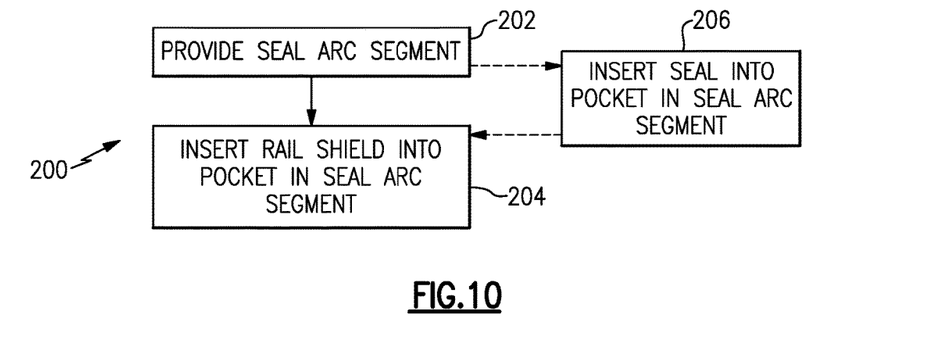
FIG. 10 illustrates an example method of assembling a blade outer air seal that has a seal arc segment and a rail shield.

FIG. 10 illustrates a method 200 of assembling the BOAS 60. At 202 the method 200 includes providing the seal arc segment 66 described herein and at 204 inserting the rail shield 80 into the pocket 78. As described, the walls 82 of rail shield 80 line the sidewalls 74 of the pocket 78. For example, the rail shield 80 may be inserted in a radial direction into the pocket 78. The method 200 may also include, at 206, inserting a seal 105 into the pocket 78. The method 200 may also be used in a replacement or repair situation where a seal arc segment 66 that is damaged is to be replaced with a new or different seal arc segment 66. For example, the rail shield 80 and/or seal 105 of the damaged seal arc segment 66 may be removed and then inserted into the new or different seal arc segment 66. Thus, the rail shield 80 and/or seal 105, if not damaged, may be re-used with the new or different seal arc segment 66.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A blade outer air seal assembly for a gas turbine engine comprising:
   a seal arc segment defining radially inner and outer sides and first and second circumferential ends, the first and second circumferential ends defining first and second seal supports, the radially outer side including radially-extending sidewalls and a radially inner surface joining the radially-extending sidewalls, the radially-extending sidewalls and the radially inner surface defining a pocket between the first and second seal supports; and
   a rail shield having radially-extending walls lining the radially-extending sidewalls.

2. The blade outer air seal assembly as recited in claim 1, further comprising a seal between the rail shield and the radially-extending sidewalls.

3. The blade outer air seal assembly as recited in claim 1, wherein the rail shield includes a plurality of walls extending from a first radial end to a second radial end, the first radial end of the plurality of walls defines a first opening, the second radial end of the plurality of walls defines a second opening, and the first opening is in fluid communication with the second opening.

4. The blade outer air seal assembly as recited in claim 3, further comprising a seal between the rail shield and the radially-extending sidewalls, wherein the seal and the rail shield seal the radially-extending sidewalls from fluid entering the first radial end of the rail shield.

5. The blade outer air seal assembly as recited in claim 4, wherein the rail shield defines a groove adjacent the second radial end, and the seal is disposed in the groove.

6. The blade outer air seal assembly as recited in claim 4, wherein the seal is a rope seal contiguous with the radially-extending sidewalls.

7. The blade outer air seal assembly as recited in claim 1, wherein the seal arc segment is a first material, the rail shield is a second material, and the first material is different from the second material.

8. The blade outer air seal assembly as recited in claim 7, wherein the second material is a metallic alloy.

9. The blade outer air seal assembly as recited in claim 1, wherein a radially outer surface of the rail shield is radially flush with a radially outer surface of the seal arc segment.

10. The blade outer air seal assembly as recited in claim 1, wherein the pocket extends circumferentially a majority of the circumferential length of the seal arc segment.

11. The blade outer air seal assembly as recited in claim 10, wherein the pocket extends axially a majority of the axial length of the seal arc segment.

12. The blade outer air seal assembly as recited in claim 1, comprising
   a carriage defining first and second support members, the first support member supporting the first seal support in a first ramped interface and the second support member supporting the second seal support in a second ramped interface.

13. The blade outer air seal assembly as recited in claim 1, wherein the rail shield is received within the pocket.

14. A gas turbine engine comprising:
   a rotor section including a rotor having a plurality of blades and at least one annular seal system circumscribing the rotor, the annular seal system comprising:
   a plurality of seal arc segments suspended by seal supports at their respective circumferential ends from a plurality of carriages, and a plurality of corresponding rail shields, each of the seal arc segments defining radially inner and outer sides, the radially outer side including radially-extending sidewalls and a radially inner surface joining the radially-extending sidewalls, the radially-extending sidewalls and the radially inner surface defining a pocket, and the corresponding rail shield having radially-extending walls lining the radially-extending sidewalls of the pocket.

15. The gas turbine engine as recited in claim 14, wherein the corresponding rail shield includes a plurality of walls extending from a first radial end to a second radial end, the first radial end of the plurality of walls defines a first opening, the second radial end of the plurality of walls defines a second opening, and the first opening is in fluid communication with the second opening.

16. The gas turbine engine as recited in claim 14, wherein the annular seal system further comprises a plurality of corresponding seals, and the corresponding seal is between the corresponding rail shield and the radially-extending sidewalls.

17. The gas turbine engine as recited in claim 14, wherein the seal arc segment is a first material, the rail shield is a second material, and the first material is different from the second material.

18. The gas turbine engine as recited in claim 14, wherein the corresponding rail shield is received within the pocket.

19. A method of assembling a blade outer air seal, the method comprising:

providing a seal arc segment that defines radially inner and outer sides, the radially outer side includes radially-extending sidewalls and a radially inner surface joins the radially-extending sidewalls, the radially-extending sidewalls and the radially inner surface define a pocket;

inserting a rail shield in the pocket, the rail shield having radially extending walls lining the radially-extending sidewalls; and suspending from a carriage a first seal support defined at a first circumferential end of the seal arc segment and a second seal support defined at a second circumferential end of the seal arc segment.

20. The method as recited in claim 19, comprising:

inserting a seal in the pocket, wherein the seal is between the rail shield and the radially-extending sidewalls.

21. The method as recited in claim 20, wherein the seal is disposed in a groove of the rail shield.

* * * * *